July 19, 1960     R. E. SEARS     2,945,366
BALL SPLINE ASSEMBLY
Filed Oct. 6, 1958

INVENTOR.
RICHARD E. SEARS
BY
ATTORNEYS

United States Patent Office 2,945,366
Patented July 19, 1960

2,945,366
BALL SPLINE ASSEMBLY

Richard E. Sears, Birmingham, Mich., assignor to Beaver Precision Products, Inc., Clawson, Mich., a corporation of Michigan Filed Oct. 6, 1958, Ser. No. 765,493
19 Claims. (Cl. 64—23)

This invention relates to a ball spline assembly and more particularly to an assembly of this type that is preloaded to eliminate back-lash between the two components of the spline connection.

While ball splines are commonly used in many applications where it is desired to have one member slidable longitudinally along and rotate with a drive member, in many such applications, it is necessary to eliminate substantially all back-lash between the two members so that there will be absolutely no lost motion in the rotating drive connection.

The present invention has for its object the provision of a relatively simple construction for preloading such ball splines.

A further object of the invention resides in a ball spline arrangement that is integrally preloaded within the confines of the spline connection itself.

Figure 1:
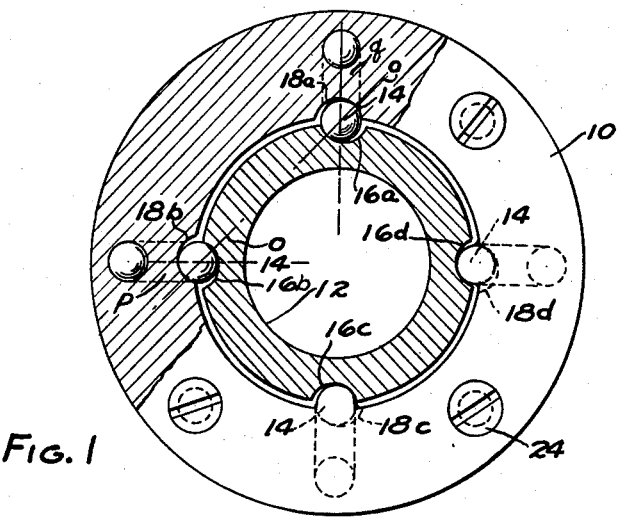
Fig. 1 is an end view, partly in section, showing a ball spline constructed in accordance with the present invention.
Figure 2:
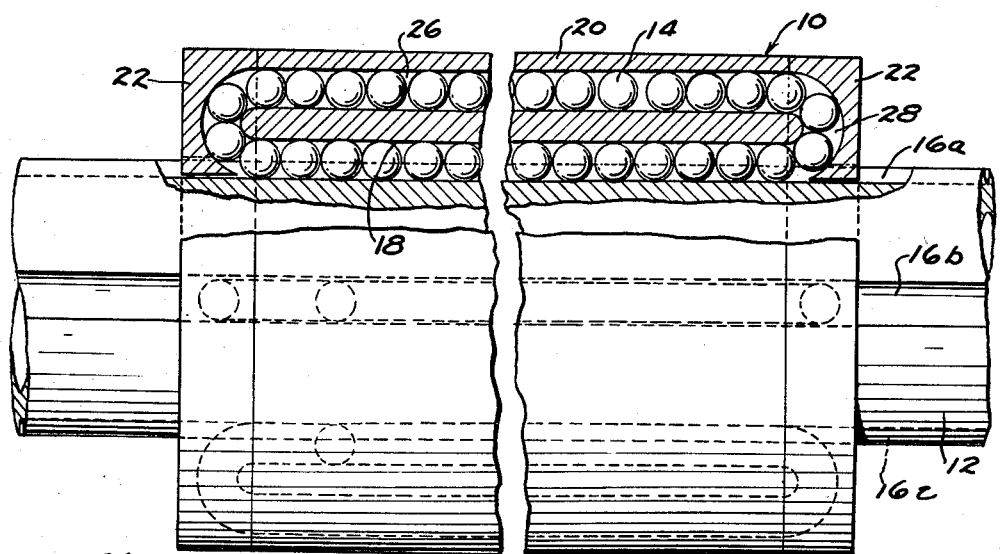
Fig. 2 is a side elevational view, partly in section, of the ball spline.

As is conventional, in the arrangement shown in the drawing, the ball spline includes an outer or guide member 10 and a much longer inner member 12 which may be referred to as a shaft. Either one of these members may be a driven member and must be adapted to transmit torque against the other member and at the same time, must be able to be moved axially relative to the other member.

In such arrangements, the use of two or more trains of balls to transmit torque from either member to the other and still permit axial movement of one member relative to the other with a minimum of friction has been the advantage of a ball spline. The means for transmitting torque from one member to the other while still permitting the members to move freely axially relative to one another comprises a plurality of trains of balls 14. The balls 14 ride in grooves 16 and 18 formed on the inner and outer members 12 and 10, respectively. In most cases, these trains of balls are of the recirculating type. In accordance with the present invention, any form of recirculating means for the balls may be employed. The recirculating means illustrated in the drawing are of the radial type.

By way of illustration, the outer member 10 comprises a cylindrical body portion 20 having cap plates 22 secured to the opposite ends thereof as by screws 24. Radially outwardly of each groove 18 in the body 20, there is provided a cylindrical conduit 26 of a size to accommodate the balls 14; and at each end of body 20, the cylindrical bores 26 are connected with their radially aligned grooves 18 by arcuate passageways 28 formed in the end caps 22. Thus, in response to axial movement of member 10 with respect to member 12, the balls 14 roll between the grooves 16 and 18 and are recirculated from one end of the grooves 18 to the opposite end thereof through the passageways 28, 26.

The present invention is directed specifically to the manner in which the balls 14 are preloaded so as to eliminate all angular motion between the members 10 and 12. Generally speaking, this preloading is accomplished by circumferentially staggering the grooves in the outer member 10 with respect to the ball grooves 16 on the inner member 12. In Fig. 1, four sets of ball grooves are shown on each of the members 10 and 12. It will be observed that grooves 18a and 18c in the outer member 10 are angularly displaced in a clockwise direction relative to the corresponding grooves 16a and 16c in the inner member 12. Likewise, the grooves 18b and 18d in the outer member 10 are angularly displaced in the opposite direction relative to the grooves 16b and 16d in the inner member 12. By angularly displacing the grooves as shown, the balls in the grooves 18a, 16a and 18c, 16c are capable of transmitting torque from the inner member to the outer member in a clockwise direction while the balls in the other two sets of grooves are capable of transmitting torque from the inner member to the outer member in a counterclockwise direction.

The grooves 16 and 18, it will be observed, are of generally semi-circular shape in cross section and are of a larger radius than the radius of balls 14. The grooves 16 and 18 can vary in shape from semi-circular to V-shape or any other desired shape. The staggered relation of the grooves 16 and 18 has been shown in a highly exaggerated condition in Fig. 1 to illustrate the principle of the present invention. In manufacture, the angular displacement of one set of ball grooves with respect to the other set could be considerably less than illustrated in Fig. 1. However, the angular displacement is in all cases predetermined such that the balls are actually under load when they are in place in the grooves. With this relative angular displacement of the two sets of grooves, a fine adjustment of the amount of preloading may be effected by a slight variation in the size of the balls 14.

As a matter of convenience in the manufacture, the grooves could be uniformly spaced in one of the members and staggered in the other member. This would be the simplest method of manufacturing the two members. However, if desired, the grooves in each member could be staggered relative to one another as illustrated in Fig. 1. In any event, the extent to which the grooves in the one member are staggered relative to the grooves in the other member will determine the contact angle of the balls with the respective grooves. In the arrangement illustrated in Fig. 1, the lines of contact between the balls and the grooves are designated o.

Figure 3:
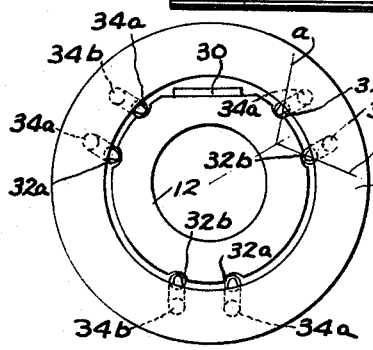
Fig. 3 is an end view of another form of ball spline in accordance with the present invention.

In some arrangements, it might be desirable to have the grooves that work in opposition to each other arranged in pairs circumferentially around the two members. This arrangement is illustrated in Fig. 3. It is admirably suited, for example, in cases where the inner member is provided with a series of rack teeth 30 on the outside thereof. In Fig. 3, no attempt has been made to show the actual angular displacement or staggering of the grooves in the inner and outer members. The inner member is provided with three pair of grooves, the grooves in each pair being designated 32a and 32b. The outer member 10 is likewise provided with three pair of grooves, the groves in each pair being designated 34a and 34b. Each of the grooves 32a are staggered circumferentially in one direction relative to the grooves 34a, while the grooves 32b are staggered circumferentially in the opposite direction relative to the grooves 34b. These two sets of grooves are staggered such that the contact angles of the balls and the grooves, that is, the angle formed between a radial line through the groove and a radial line through the ball and the point of contact, are as indicated at $p$ and $q$. These contact angles are equal and opposite.

With this arrangement, it will be observed that the rack teeth 30 can be conveniently located on the outside of the inner member 12 between two adjacently positioned pair of grooves 32. A compact arrangement is thus provided; and at the same time, a predetermined preloading of the balls is assured. Preferably, in order to obtain a centralizing condition of the inside member with respect to the outside member, a minimum of two ball grooves working in each direction should be employed.

Thus, it will be seen that I have provided a simple and compact arrangement wherein ball splines may be integrally loaded within the confines of the spline connection. This arrangement prevents any angular or radial freedom of movement of one of the members relative to the other. In addition, the staggering of the ball grooves and the dimensioning of the balls can be so controlled as to produce a predetermined amount of preloading. In this manner, the low rate portion of the deflection curve for the balls in the grooves can be avoided, and the stiffness of the ball spline under angular stress is substantially increased.

At the same time, it will be appreciated that the preloaded unit is self-contained. In this connection, it will be appreciated that two pair of opposing grooves, the grooves in each pair being spaced 180° apart, is the minimum condition to make the assembly self-contained. The angular relationship between the two pair of grooves could vary over wide limits.

I claim:

1. In a rotating assembly which includes a longitudinally extending inner member and an outer member mounted on the inner member for rotation therewith and for relative longitudinal movement thereon, means interconnecting said members for preventing relative angular movement between the members comprising a pair of longitudinally extending grooves on the outer surface of the first member and a pair of longitudinally extending grooves in the second member, the grooves in the first member being juxtaposed to the grooves in the second member, the circumferential distance between the grooves on the outer member being slightly different than the circumferential distance between the grooves in the inner member, and ball members disposed in each of said juxtaposed pair of grooves, said ball members having a diameter such that relative angular movement between said inner and outer members in one direction is prevented by the inter engagement of the ball members with one pair of said juxtaposed grooves and relative angular movement between said inner and outer members in the opposite direction is prevented by the interengagement of the ball members with the other pair of juxtaposed grooves.

2. The combination set forth in claim 1 wherein said grooves are of generally semi-circular shape in cross section and the radii of the balls is less than the radii of the grooves.

3. The combination set forth in claim 1 including means in the outer member for recirculating the ball members from one end of the grooves therein to the opposite end thereof.

4. In a rotating assembly which includes a longitudinally extending inner member and an outer member mounted on the inner member for rotation therewith and for relative longitudinal movement thereon, means interconnecting said members for preventing relative angular movement between the members comprising a pair of longitudinally extending grooves on the inner member, a pair of longitudinally extending grooves on the inside of the outer member, the grooves on the inner and outer members being generally juxtaposed with the grooves on one of the members being spaced apart circumferentially a slightly greater distance than the grooves on the other member and a series of balls having a close fit with the grooves in each juxtaposed pair.

5. The combination set forth in claim 4 wherein the balls in each pair of juxtaposed grooves contact the grooves at diametrically opposite sides of the ball members, the lines of contact in the grooves of each pair defining a plane spaced radially from the longitudinal axis of said members.

6. The combination set forth in claim 4 wherein the balls are dimensioned such as to cause preloading when arranged in said grooves.

7. In combination, a shaft, a guide member extending circumferentially around the shaft, said shaft having a series of at least four axially extending grooves spaced around the periphery thereof, said guide member having a series of at least four axially extending grooves on the inner surface thereof with each groove juxtaposed to a groove in the shaft, each pair of circumferentially adjacent grooves in the guide member being spaced apart circumferentially a slightly different distance than the corresponding grooves in the shaft, and a series of balls in each pair of juxtaposed grooves having a close fit therewith.

8. The combination set forth in claim 7 wherein the balls have a nominal diameter greater than the minimum diameter across the juxtaposed grooves such that they are preloaded when arranged in said grooves.

9. The combination set forth in claim 7 including means associated with each groove on the guide member for recirculating the balls from one end of the groove to the other.

10. The combination set forth in claim 7 wherein the grooves are spaced apart circumferentially uniformly on one of said members.

11. In combination, a shaft, a guide member extending circumferentially around the shaft, said shaft having a series of at least four axially extending grooves spaced around the periphery thereof, said guide member having a series of at least four axially extending grooves on the inner surface thereof with each groove juxtaposed to a groove in the shaft, two of the grooves in the guide member being circumferentially offset slightly in one direction relative to the corresponding grooves in the shaft and the other two grooves in the guide member being circumferentially offset slightly in the opposite direction relative to the corresponding grooves in the shaft.

12. The combination set forth in claim 11 wherein said grooves are generally semi-circular in cross section and have a radius greater than that of the balls.

13. The combination set forth in claim 11 wherein the contact angles of the balls in two sets of the juxtaposed grooves are equal and opposite to the contact angles of the balls with the other two sets of juxtaposed grooves.

14. The combination set forth in claim 11 wherein one of the two grooves circumferentially offset in one direction lies circumferentially between the two grooves offset circumferentially in the opposite direction.

15. The combination set forth in claim 11 wherein the extent to which the juxtaposed grooves in the shaft and guide member are offset is the same for each set of juxtaposed grooves and the balls in one set of juxtaposed grooves have the same diameter as the balls in the other sets of juxtaposed grooves.

16. In combination, a shaft, a guide member extending circumferentially around said shaft, said shaft having a plurality of pairs of longitudinally extending ball grooves therein, the grooves in each pair being positioned circumferentially adjacent one another, said guide member having a corresponding number of pairs of ball grooves extending longitudinally along the inner surface thereof, each pair of grooves on the shaft member being juxtaposed to the pairs of grooves on the guide member, the grooves in each pair on the shaft being spaced apart circumferentially a slightly different distance than the juxtaposed grooves on the guide member, and a series of balls having a close fit and interposed between each set of juxtaposed grooves, the contact angle between the balls and the grooves being equal and opposite for the grooves in each pair.

17. The combination set forth in claim 16 wherein said shaft is provided with an axially extending series of rack teeth on the outer periphery thereof positioned intermediate two of the pair of grooves thereon.

18. The combination set forth in claim 16 including means in the guide member for recirculating the balls from one end of the grooves in the guide member to the opposite end thereof.

19. The combination set forth in claim 16 wherein the balls are dimensioned oversize relative to the minimum diameter across each set of juxtaposed grooves so that they are preloaded when interposed between the grooves.

References Cited in the file of this patent

UNITED STATES PATENTS

| | | |
|---|---|---|
| 1,918,108 | Jonkhoff | July 11, 1933 |
| 2,845,782 | Glover | Aug. 5, 1958 |

FOREIGN PATENTS

| | | |
|---|---|---|
| 576,510 | France | May 14, 1924 |
| 1,070,248 | France | Feb. 17, 1954 |
| 1,125,204 | France | July 9, 1956 |